United States Patent
Scherl et al.

(10) Patent No.: US 8,115,653 B2
(45) Date of Patent: Feb. 14, 2012

(54) METHOD AND DEVICE FOR OUTPUTTING PARKING INSTRUCTIONS

(75) Inventors: Michael Scherl, Bietigheim (DE); Peter Preissler, Dorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 428 days.

(21) Appl. No.: 11/922,301

(22) PCT Filed: Apr. 27, 2006

(86) PCT No.: PCT/EP2006/061879
§ 371 (c)(1),
(2), (4) Date: Oct. 30, 2009

(87) PCT Pub. No.: WO2006/133996
PCT Pub. Date: Dec. 21, 2006

(65) Prior Publication Data
US 2010/0039292 A1 Feb. 18, 2010

(30) Foreign Application Priority Data
Jun. 13, 2005 (DE) .......................... 10 2005 027 165

(51) Int. Cl.
*B60Q 1/48* (2006.01)
*B60S 9/00* (2006.01)
(52) U.S. Cl. ........ 340/932.2; 340/425.5; 701/1; 701/41; 180/199; 180/204
(58) Field of Classification Search ................. 340/932.2
See application file for complete search history.

(56) References Cited

U.S. PATENT DOCUMENTS

| | | | |
|---|---|---|---|
| 4,931,930 A * | 6/1990 | Shyu et al. ....................... 701/36 |
| 6,929,082 B2 * | 8/2005 | Kataoka et al. ............... 180/204 |
| 7,053,795 B2 * | 5/2006 | Maemura et al. .......... 340/932.2 |
| 2006/0190147 A1 | 8/2006 | Lee et al. |

FOREIGN PATENT DOCUMENTS

| | | |
|---|---|---|
| DE | 29 32 118 | 2/1981 |
| DE | 38 13 038 | 11/1989 |
| DE | 103 31 235 | 2/2005 |
| DE | 10 2004 047 484 | 4/2006 |
| EP | 1 403 138 | 3/2004 |
| FR | 2 785 383 | 5/2000 |
| JP | 2000-313291 | 11/2000 |
| WO | WO 2005/014371 | 2/2005 |

OTHER PUBLICATIONS

International Search Report, PCT International Patent Application No. PCT/EP2006/061879, dated Aug. 4, 2006.

* cited by examiner

*Primary Examiner* — Donnie Crosland
(74) *Attorney, Agent, or Firm* — Kenyon & Kenyon LLP

(57) ABSTRACT

In a method and a corresponding device for outputting parking instructions to a driver of a vehicle, the parking process is divided into a multiplicity of sections each having a constant specified steering angle, and there being situated between each two sections a stopping point that is to be approached after a corresponding stop instruction within a stopping path. A respective tolerance band is defined for the stopping path and/or for the steering angle, a corresponding stop instruction, corresponding to a specified stopping path, and/or a corresponding specified steering angle being defined for each section, taking into account the respective tolerance band.

10 Claims, 6 Drawing Sheets

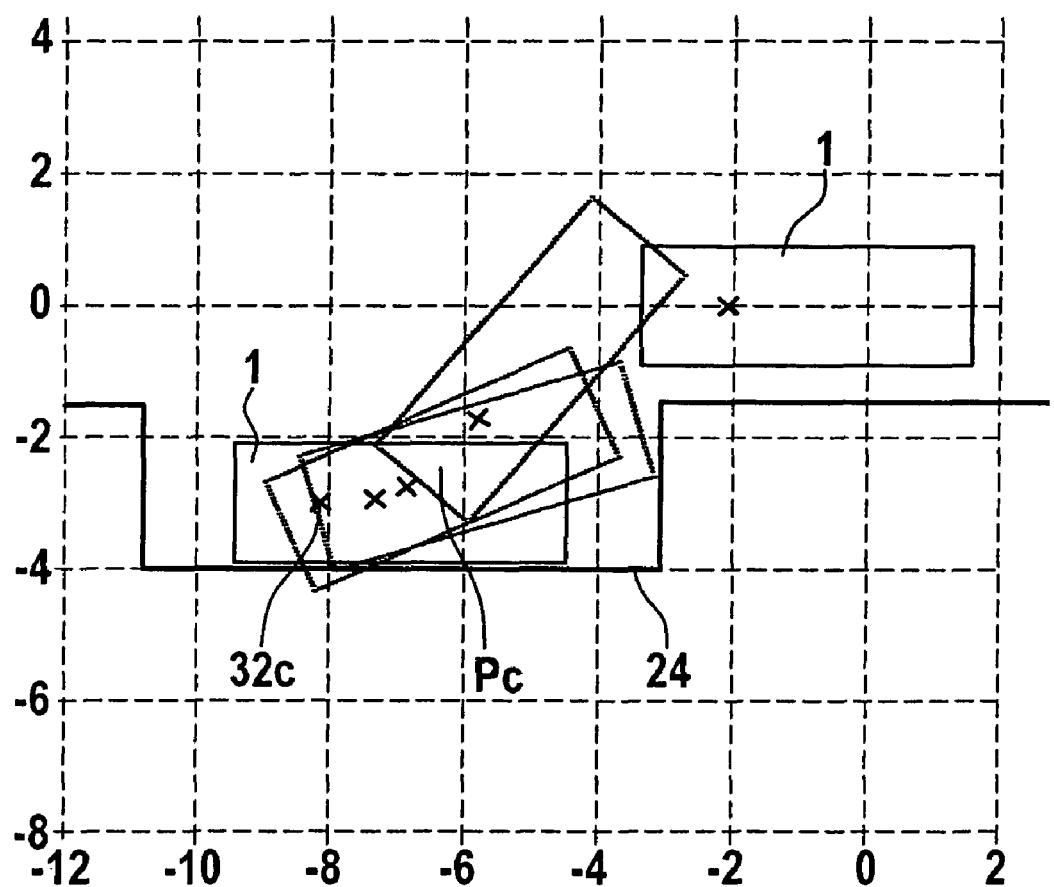

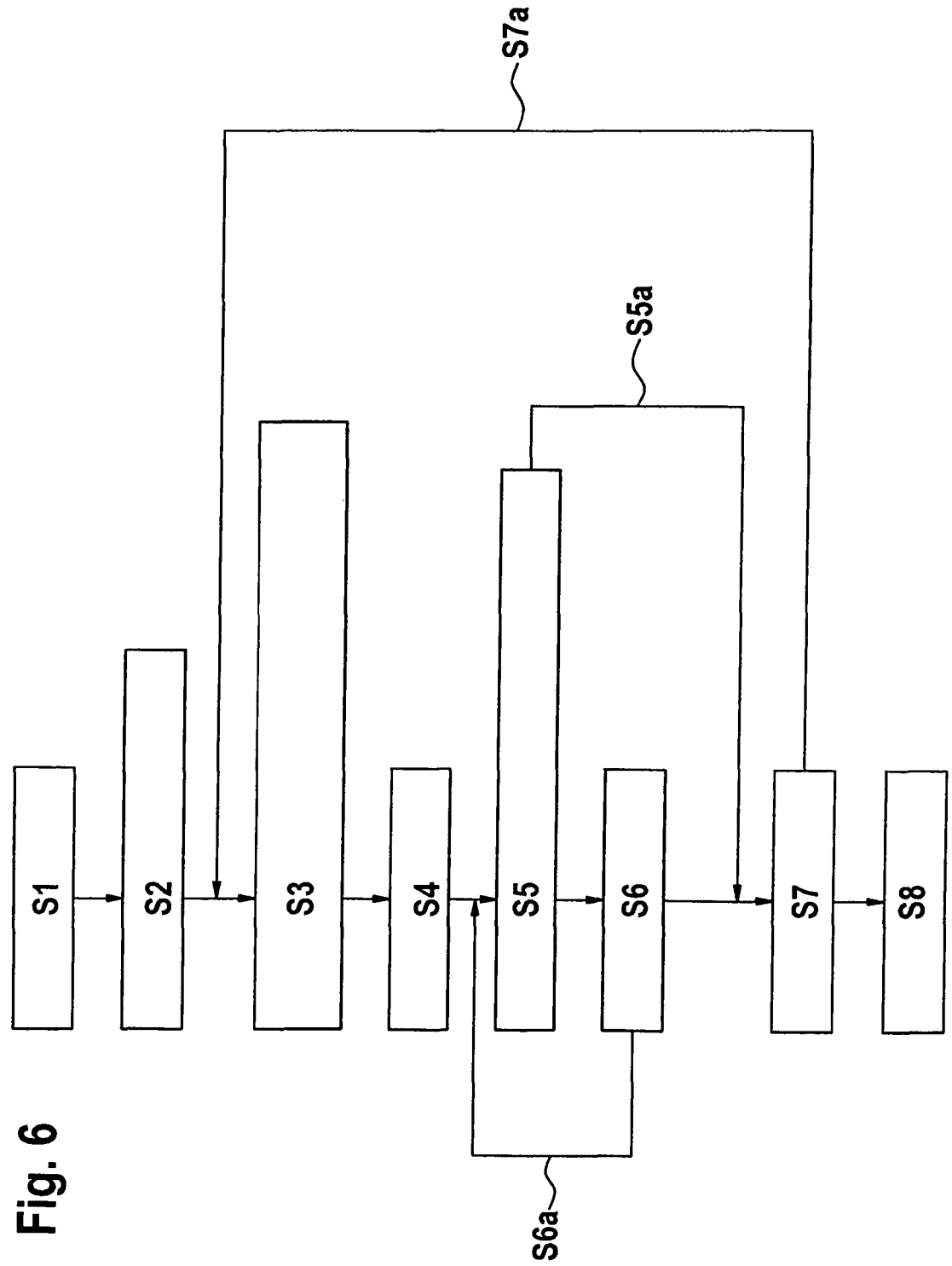

METHOD AND DEVICE FOR OUTPUTTING PARKING INSTRUCTIONS

FIELD OF THE INVENTION

The present invention relates to a method and a device for outputting parking instructions.

BACKGROUND INFORMATION

Increasing traffic density and new construction continue to narrow available traffic space, in particular in densely populated areas. Available parking space becomes more limited, and the search for a suitable parking space, together with the constant increase in traffic, places stress on the driver. Therefore, semi-autonomous parking assistants (SPA) have been developed to help the driver when parking. In this way, the decision as to whether or not the car will fit into a given parking space is made easier, or even taken over entirely by the system. Subsequently, the system gives the driver instructions for speedy parking. Though applicable to any parking spaces, the present invention and the problem on which it is based are explained with reference to the process of parking a motor vehicle in a parallel parking space.

German Published Patent Application No. 29 32 118 describes a system for parking assistance that measures the distances from obstacles in the environment of the motor vehicle, and warns the driver of collision with these obstacles. However, this system does not facilitate parking as such, but rather only warns the driver of collisions with other vehicles or objects.

German Published Patent Application No. 38 13 038 describes a parking system that measures the parking space while driving by it, and assists the driver during parking. The parking trajectory planned by the parking system is made up of straight segments and circular arcs, i.e., the driver steers only while stationary. The points situated in between, known as turning points, cannot be precisely stopped at by the driver. The driver will make mistakes both during transverse guiding (setting and holding of the desired steering wheel angle) and also during longitudinal guiding (observing the stopping or turning point). Moreover, errors due to the measurement of the parking space will additionally have the result that stopping points must be corrected. The higher the degree of robustness of the overall system against such errors, the higher its degree of acceptance by the driver will be.

On the one hand, the process of parking requires that the driver actuate the steering wheel in order to effect the steering, and on the other hand he has to move the vehicle forward or backward through acceleration. If necessary, the vehicle is also stopped at a point provided for this purpose in order to enable execution of a change of direction by turning the steering wheel or by changing gear. In general, the instructions are provided in such a manner that the driver is not supposed to drive the vehicle while he is turning the steering wheel, so that while steering is taking place the vehicle is at a standstill, and when the vehicle is in motion the steering angle is generally not to be further modified. In particular, unambiguous steering positions are achieved by instructing the driver to carry out a full steering turn while at a standstill. The driver is thus directed to follow a parking trajectory that is made up of straight segments, or, if necessary, circular arcs that are as tight as possible. When the driving and the steering are separated, various characteristics of the driver with respect to his reaction time can be excluded, because the individual actions are to be executed by the driver independent of operating speed. However, this procedure is fairly laborious for the driver. German Published Patent Application No. 10 2004 047 484 describes a method for outputting parking instructions to a driver of a vehicle, in which a steering instruction for turning the steering is outputted, and, after a specified distance after the outputting of the steering instruction, a corrective instruction is then outputted if, at an end of the specified distance, at least a specified steering angle of the steering system has not been set.

This method has the particular characteristic that at first a steering instruction for turning the steering is outputted to the driver, but it is not checked until after a specified distance has been traveled whether a specified steering angle has now been set. This gives the driver the opportunity to turn the steering while moving. In this way, steering while at a standstill is avoided. In addition, within a certain tolerance range the driver can also turn the steering wheel with the speed to which he is accustomed. He does not have to be limited to a specified steering speed. This makes steering easier, in particular while moving. If steering while moving is allowed, a lower torque has to be applied for the actuation of the steering system, because steering is easier while the vehicle is rolling than when it is at a standstill. As a whole, the parking process is more comfortable for the driver, because it corresponds more closely to the standard parking procedure without assistance, in which steering and moving generally take place together. In addition, the smoother flow of the procedure can reduce the time required for the parking process. In this way, the roadway, which may be blocked at least partly by the parking process, is cleared again more quickly for subsequent traffic. Thus, the specified distance defines a turning zone within which the driver can carry out a required steering modification. Because at the end of the turning zone it is nonetheless checked whether a turning has taken place, a correction can still be carried out for the case in which the driver has not sufficiently actuated the steering wheel. Even for the case in which the driver has not acted correctly, at this time in general a correction is still possible such that the parking process can be continued and brought to a successful conclusion. However, this method has the disadvantage that often after a specified distance has been traveled a correction will take place, and the driver is always guided back to an initially calculated optimal trajectory.

German Published Patent Application No. 103 31 235 discloses a driver assistance device, in particular for parking a motor vehicle, having an output unit for outputting driving instructions to a driver, in which the driving instructions indicate to the driver a driving range between two trajectories that are calculated such that the vehicle can be moved within the driving range in order to freely select a path into the parking space.

In this way, the driver need not follow a single prespecified ideal line, while nonetheless being assured that there is no risk of collision.

Example embodiments of the present invention for outputting parking instructions may provide that a high degree of robustness is ensured by taking possible errors into account in the trajectory planning. A system distinguished by a robust trajectory planning of this sort provides larger tolerance ranges for the driver's actions (maintenance of stopping path and steering wheel angle), and simultaneously reduces the number of unsuccessful, aborted parking attempts due to driver error or mistakes in measuring the parking space. In this manner, the acceptance of the overall system by drivers is increased.

In the method according to example embodiments of the present invention for outputting parking instructions to a driver of a motor vehicle, the parking process includes a multiplicity of sections, each having a constant specified steering angle, there being situated between each two sections a stopping point within a stopping path that is to be approached after a corresponding stopping instruction.

First a trajectory is calculated, and the resulting required steering angle is specified to the driver. On the basis of a trajectory planning using the current steering angle and the current position, at each point in time it is checked whether the parking process can be successfully carried out, i.e. whether the trajectory selected at that moment by the driver leads to a successful conclusion of the parking process. As long as this is the case, no instruction is issued for the interruption, correction, or abortion of the parking process. This provides that a maximum degree of tolerance of errors in steering can be achieved, not only when the steering angle is first set but also during travel. If during curved travel the driver makes a change to the steering, this error is accepted, i.e., further planning continues with the current value as long as successful parking is possible.

The particular robustness of the device or of the method is achieved in that a tolerance band is defined for the stopping path and/or for the steering angle, and for each section a corresponding stopping instruction is defined, corresponding to a specified stopping path and/or a corresponding specified steering angle, taking the tolerance band into account.

This robustness is noticeable in particular in relation to errors of the following type:
driver errors in maintaining the steering wheel angle during travel in a straight line or on a curved path;
driver errors when stopping at the end of a section;
errors in measuring the boundaries of the parking space.

This robustness can be achieved in particular through the following measures:

The trajectory planning is carried out not only at the beginning of the parking process, but is executed cyclically whenever the vehicle is in motion.

The robustness with respect to steering wheel angle deviations is achieved in that the cyclical trajectory planning during vehicle movement always takes into account the current steering wheel angle for the current section, and a correction of the steering wheel angle is required only if a successful termination of the parking process is no longer possible with the current steering wheel angle. In this way, the maximum possible tolerance is achieved with respect to errors in maintaining the steering wheel angle.

Robustness with respect to maintaining the stopping points (longitudinal guiding) or also with respect to errors in parking space measurement is achieved in that what is followed is not an optimal trajectory, but rather a selected trajectory such that, even if the next stopping point, or optionally all following stopping points, are not observed, said trajectory will reliably result in a successful termination of the parking process as long as the intermediate point is situated within the possible range of intermediate points of the current specified trajectory.

According to example embodiments, during a driving instruction it is cyclically checked whether the current steering angle lies within a valid range of possible steering angles for a successful parking. A corrective instruction for stopping and for setting a corrected steering angle is outputted only if the relevant steering angle lies outside the range of valid steering angles.

According to example embodiments, immediately after the stopping of the vehicle at a respective stopping point it is checked whether the stopping path lies within a valid range of possible stopping paths for a successful parking. A corrective instruction for setting the correct stopping path in the form of an additional section is outputted only if the actual stopping path is situated outside the range of valid stopping paths.

According to example embodiments, the tolerance band or bands is/are dynamically adapted. The method is thus adaptive, so that for example the day-to-day condition of the driver can be taken into account.

According to example embodiments, the dynamic adaptation of the tolerance band for the stopping path takes into account a statistical variance of acquired stopping paths.

According to example embodiments, the dynamic adaptation of the tolerance band for the steering angle takes into account a statistical variance of acquired steering angle settings.

According to example embodiments, the size of the respective tolerance band can be selected corresponding to various driver categories.

According to example embodiments, on the basis of at least one criterion a successful parking process is defined ahead of time, the criterion permitting a multiplicity of final positions.

According to example embodiments, the criterion is selected from the following group: maximum number of passes, minimum pass length, maximum protrusion into the opposite lane of traffic, minimum or maximum distance from the curb, maximum distance to a reference line defined by adjacent parked vehicles, maximum angular deviation from the direction of the curb or to a reference line, minimum or maximum distance to the front and rear boundaries of the parking space.

Exemplary embodiments of the present invention are shown in the drawing, and are explained in more detail in the following description.

BRIEF DESCRIPTION OF THE DRAWINGS

FIGS. 5*a-c* show various examples of possible parking processes with various initial steering angles; and FIG. 6 shows a sequence of the method according to an example embodiment of the present invention.

DETAILED DESCRIPTION

Example embodiments of the present invention described below are applicable in particular to motor vehicles parking in parallel parking spaces situated laterally along a street. When parking in such parallel parking spaces in particular it is necessary first to make a first turn of the steering wheel, followed by a turn in the other direction. The calibration of these two turning points makes it particularly difficult for the driver to park in such parking spaces.

Figure 1:
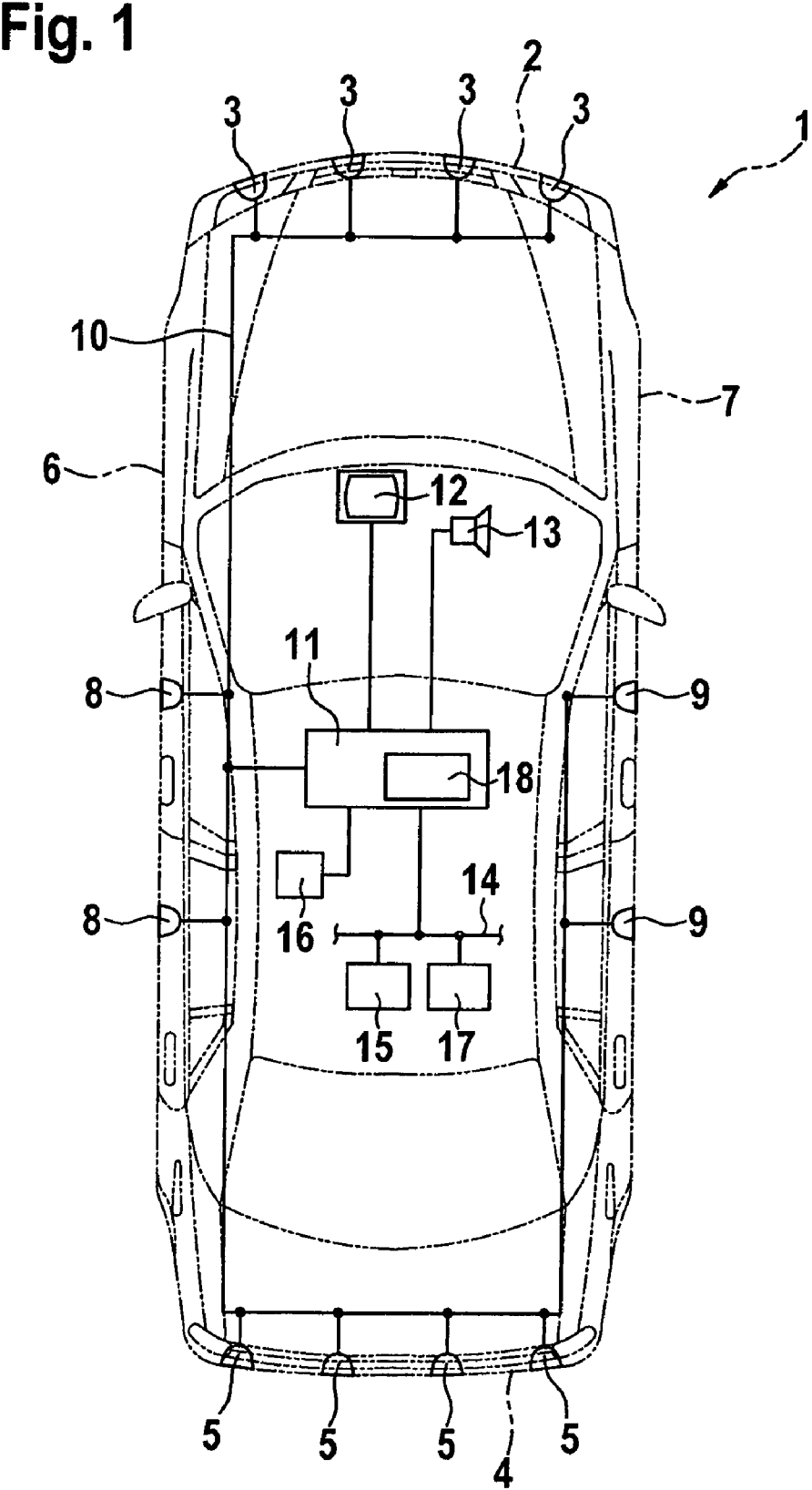
FIG. 1 schematically shows a vehicle having a device for outputting parking instructions according to an example embodiment of the present invention.

FIG. 1 schematically shows a vehicle having a device for outputting parking instructions according to an example embodiment of the present invention.

FIG. 1 schematically shows a motor vehicle 1. On a front side 2 of the vehicle, distance sensors 3 are situated. On a rear side 4 of the vehicle there are also situated distance sensors 5. On a left side 6 of the vehicle and on a right side 7 of the vehicle, distance sensors 8, 9 are also provided. The distance sensors measure distances to obstacles in the environment surrounding the vehicle. Distance sensors 3, 5, 8, 9 are realized in particular as ultrasound sensors. However, they can also measure the distance based on a different design principle, e.g. optical signals or radar signals. In addition, video sensors are also possible that determine a distance from recorded image information. Distance sensors 3, 5, 8, 9 supply their measurement data, or determined distance values, via a data bus 10 to an evaluation unit 11 having a storage device 18 in vehicle 1. Evaluation unit 11 determines the distances from obstacles in the surroundings of the vehicle and the position of these obstacles. This takes place in particular by evaluating the measurement data of the individual sensors in combination. Evaluation unit 11 can also operate the sensors in various measurement modes, so that for example the speed of a signal transmission is adapted to the respective vehicle speed. In this way, the measurement conditions can be adapted between a measurement of a parking space while driving by the space, and a parking process, which is generally carried out more slowly. From the distance values, evaluation unit 11 can thus determine a map of the surroundings of the vehicle.

In addition, evaluation unit 11 is designed to determine a suitable parking space and to determine a trajectory into this parking space. In addition, it may also determine outputs to the driver. For the output, evaluation unit 11 is connected to a display 12. In addition, acoustic outputs are possible via a loudspeaker 13. Display 12 is realized in particular as a display screen of a navigation display device in the vehicle. In addition, instructions can also be outputted via a display in a multi-instrument panel, via a head-up display or via LED displays additionally mounted on the dashboard. In order to determine a movement of the vehicle, evaluation unit 11 may be connected via a data bus 14, realized in particular as a CAN bus, to at least one path sensor 15. In an example embodiment, path sensor 15 is realized as a wheel rotational speed sensor that measures a wheel movement of the vehicle. If a wheel movement is detected, a distance traveled by the vehicle is determined on the basis of the wheel rotation and the wheel circumference. In order also to able to determine the direction of travel, evaluation unit 11 is in addition connected to a steering angle sensor 16 by which the current steering direction of the vehicle can be evaluated. A direction of travel forward or backward is determined in particular from a transmission lever position or from a setting of a transmission, by a transmission sensor 17.

In the example embodiment, evaluation unit 11 is designed also to determine the reaction time of the driver. Using path sensor 15, it compares in particular how quickly the driver follows a stop instruction outputted via display 12 or via loudspeaker 13. It can classify drivers into different categories, e.g. slow, normal, and fast.

In addition, however, a reaction time can also be determined as time information. Likewise, the speed with which the predetermined steering angle is set can be used. In addition, in order to determine the reaction time evaluation unit 11 can also access, via a data bus 14, other vehicle systems, e.g. an ACC (Adaptive Cruise Control) system, that are not part of the steering system.

Figure 2:
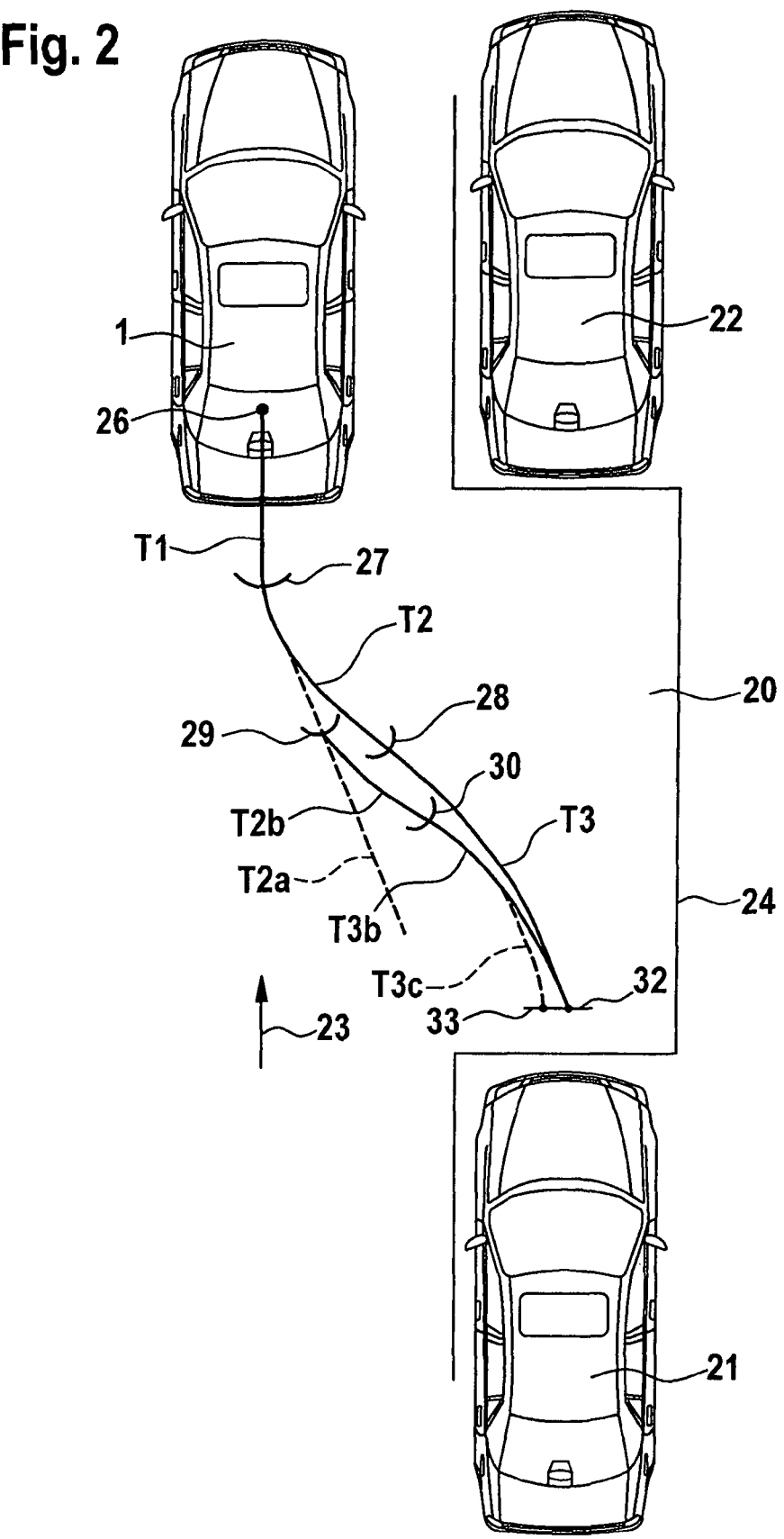
FIG. 2 shows a parking process using the device for outputting parking instructions.

FIG. 2 illustrates a parking process using the device for outputting parking instructions.

In principle, the parking process is divided into a plurality of sections T1 to T3, each having a prespecified steering angle VLW (cf. FIG. 4) that is different but that is constant within a section (here: straight ahead-right-left). Between each two sections T1, T2 or T2, T3, there is situated a stopping point 27 or 28 that is to be approached after a corresponding stop instruction within a stopping path W (cf. FIG. 3).

Vehicle 1 has the devices explained in FIG. 1 for carrying out the method. Vehicle 1 is to park in a parking space 20 that is situated between a first vehicle 21 and a second vehicle 22. Vehicle 1 has previously driven past first vehicle 21, parking space 20, and second vehicle 22 in arrow direction 23, during which sensors 9 situated on the right side 7 of the vehicle measured the distance to vehicles 21, 22. Here it has turned out that between vehicles 21, 22 parking space 20 is free in which vehicle 1 can park. A distance line 24 determined by sensors 9 indicates the dimensions that were determined by the sensors when driving by the space.

Evaluation unit 11 determines, using a calculating unit allocated to it, the trajectory from the current position 26 of vehicle 1 into parking space 20. From the distance measurement, in connection with the measurement of the traveled distance by path sensor 15 and the measurement of the steering angle by steering angle sensor 16, evaluation unit 11 is informed at all times as to which position vehicle 1 has assumed in relation to other vehicles 21, 22, and in particular in relation to parking space 20.

Therefore, evaluation unit 11 can calculate a first specified trajectory, made up of sections T1, T2, T3, starting from current position 26 of vehicle 1 and leading into parking space 20. This trajectory is shown in FIG. 2 with regard to selected reference point 26, here the midpoint of the rear axle of the vehicle.

At initial position 26, the driver is given a corresponding steering angle setting instruction, and is then given a driving instruction as soon as the steering angle has been set.

Starting from initial position 26 of vehicle 1, the driver must first move backward a short distance in a straight line until stopping point 27. Shortly before first stopping point 27, the driver is given a stop instruction.

After the stopping at stopping point 27, the driver is given a steering angle instruction for section T2, and is subsequently given a new driving instruction as soon as the new steering angle has been set. He then continues travel until second stopping point 28 has been reached, etc.

Evaluation unit 11 constantly checks whether the position and the current steering angle of vehicle 1 still make it possible to carry out a successful parking process. The definition of "successful" here can be determined in one or more corresponding criteria, e.g. maximum number of passes, minimum pass lengths, maximum protrusion into the opposite lane of traffic, minimum or maximum distance to the curb, maximum distance to a reference line defined by adjacent parked vehicles, maximum angular deviation from the direction of the curb or from a reference line, minimum or maximum distance to the front and rear boundary of the parking space.

If it is determined that a successful parking process is not possible, a corrective instruction is given to the driver via display 12 and/or via loudspeaker 13, namely the instruction to stop at once and to set a particular steering angle.

In the present exemplary embodiment, the steering angle for second section T2 is modified by the driver shortly after the beginning thereof in such a way that it results in trajectory T2a, shown as a broken line, which would not provide a successful parking process. Correspondingly, a stop instruction is issued and a steering angle correction instruction is issued at the subsequently approached stopping point 29, in order to bring the vehicle to a new successful trajectory made up of sections T2b and, subsequently, T3b, until final position 32 is reached.

After the stopping at the new stopping point 30, the driver is given a steering angle instruction for section T3b, and is subsequently given a new instruction to drive as soon as the new steering angle has been set. As can be seen clearly, the steering angle for third section T3b is likewise modified shortly after its beginning by the driver in such a way that it leads to trajectory T3c, shown as a broken line, having end point 33. This end point 33 deviates from the originally planned end point 32, but is still within the range of valid end points for a successful parking process, so that no corrective instruction is given, because such an instruction is issued only if a successful parking process is no longer possible.

Figure 3:
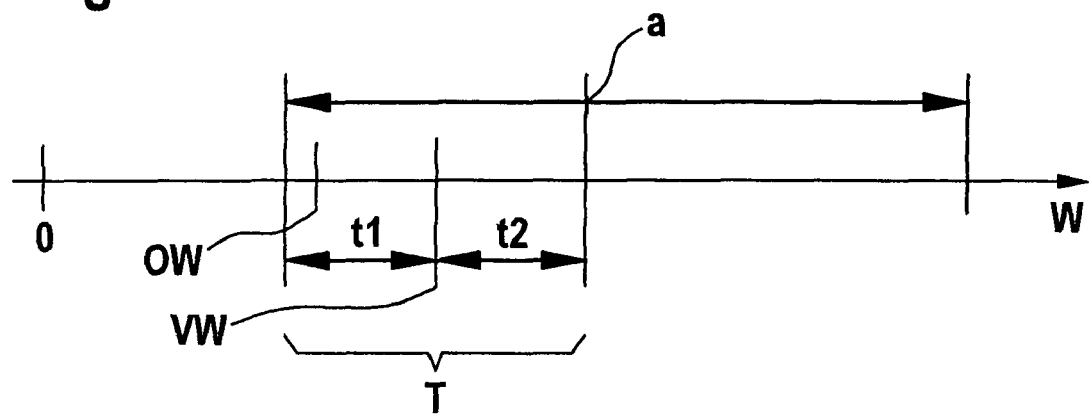
FIG. 3 shows a schematic representation of the stopping path still to be traveled and of a robust stopping path specification.

FIG. 3 shows a schematic representation of the stopping path still to be traveled and of a robust stopping path specification.

In the example embodiment, the possibility is taken into account that the driver will make mistakes in maintaining the specified stopping path VW within a tolerance range T that is to be determined. Stopping path VW specified to the driver, at the end of which he is supposed to stop, can thereby deviate from an optimal stopping path OW.

In FIG. 3, double arrow a designates the range of possible stopping paths W that provide a successful parking process, as defined previously. It can be seen that a narrowing of the "successful" parking to a single end position results in a narrower range a than does the definition of a multiplicity of possible end positions.

The optimal path is designated by reference character OW, and is situated slightly above the lower limit of possible range a. When specifying optimal stopping path OW, there would be a high risk that the driver would move into a range underneath possible range a, at an intermediate position. This would have the consequence that a corrective instruction would be necessary for the continuation of the parking process. The method, in contrast, provides tolerance range T, within which a successful parking is ensured with a high probability, and whose upper and lower halves are indicated by two double arrows having reference characters t1, t2, to the left and to the right of the specified stopping path VW.

Thus, in the example according to FIG. 3 what is specified is not optimal stopping path OW, but rather a stopping path that is larger by the left half t1 of tolerance range T than the lower limit of range a of possible stopping paths or trajectories.

Of course, optimal stopping path OW is always specified whenever predetermined tolerance range T around optimal stopping path OW lies completely within the possible range.

The width of tolerance band T can be a fixed parameter, or else can be capable of being prespecified by the system dependent on, for example, the length of the parking space or speed of travel. A fixed parameter has the advantage of higher transparency for the driver, while a dynamically specifiable value will permit a larger tolerance range for uncritical parking spaces than for narrow parking spaces. One possibility for determining the tolerance range is the statistical variance, or a corresponding multiple of the statistical variance, of stopping paths achieved for various drivers with the instructions used by the parking system.

In addition, the tolerance width should be dimensioned such that the typical errors of the driver in maintaining the stopping path are smaller. For this purpose, either a statistical value over many drivers or an individually determined value for the current driver can be used.

Figure 4:
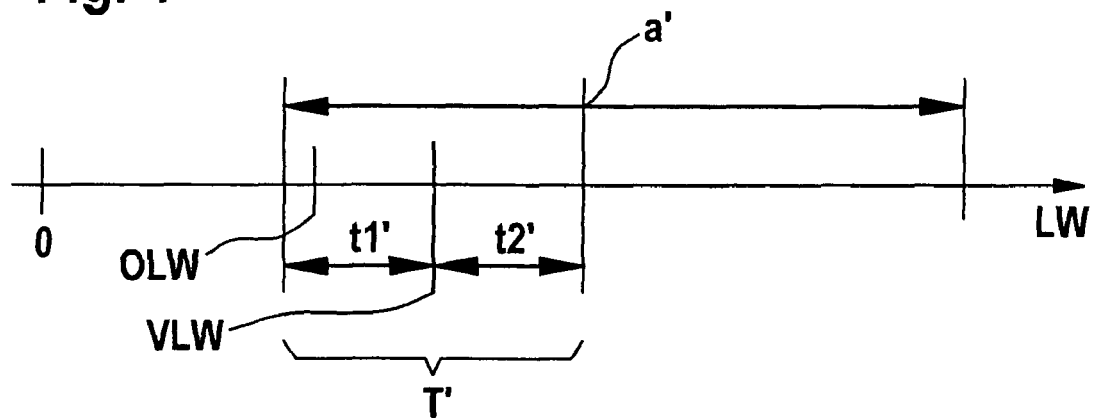
FIG. 4 shows a schematic representation of the set steering angle and of a robust steering angle specification.

FIG. 4 shows a schematic representation of the set steering angle and of a robust steering angle specification.

In the example embodiment, the possibility is likewise taken into account that the driver will make errors within a tolerance range T' that is to be determined of steering angle LW. Steering angle VLW specified by the driver will thus as a rule deviate from an optimal steering angle OLW.

In FIG. 4, double arrow a' designates the range of possible steering angles LW that provide successful parking, as defined above. Again, a narrowing of the "successful" parking to a single possible parking position results in a narrower range a' than does a determination of a multiplicity of possible parking positions.

The optimal steering angle is designated by reference character OLW. The method provides, for steering angle LW, tolerance range T', within which a successful parking is ensured with a high probability, and whose upper and lower halves are depicted by two double arrows having reference characters t1', t2' to the left and to the right of specified steering angle VLW.

Here as well, the system does not specify optimal steering angle OLW, but rather specifies a steering angle that is larger by the left half t1' of tolerance band T' as the lower boundary of range a' of possible steering angles LW. Of course, optimal steering angle OLW is specified whenever specified tolerance range T' around optimal steering angle OLW lies completely within the possible range.

Figure 5A:
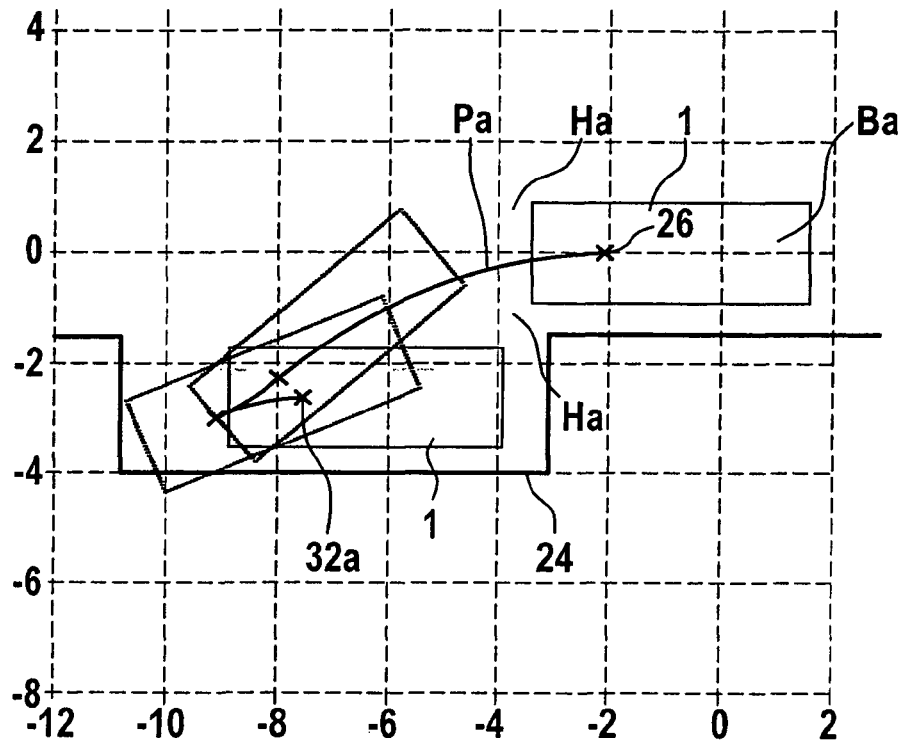
Figure 5B:
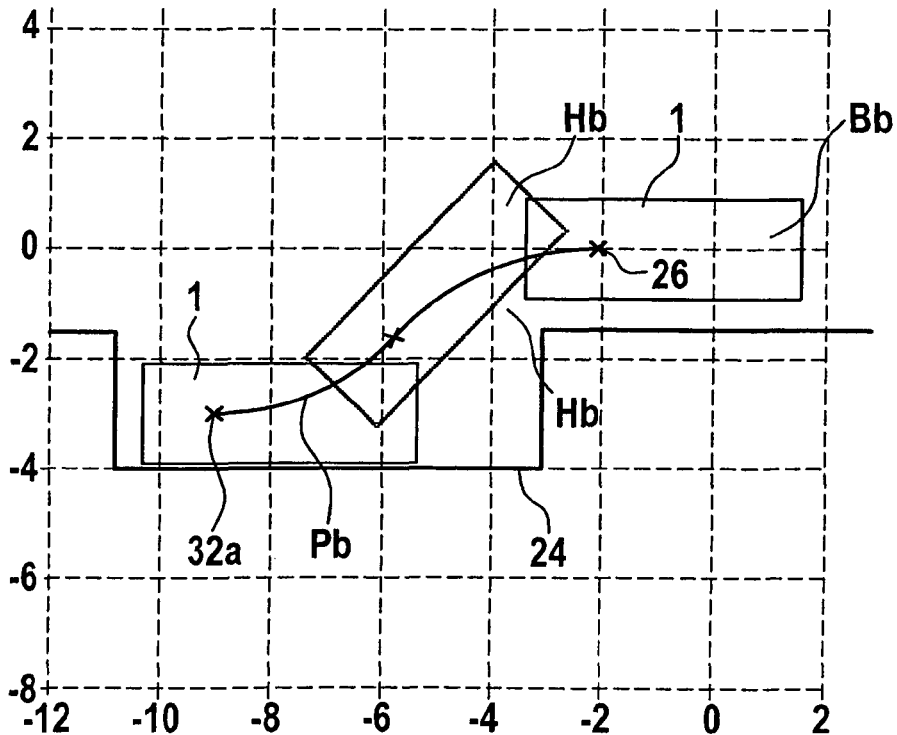

FIGS. 5a-c show various examples of possible parking processes for various initial steering angles. The initial position for the parking processes shown as examples in FIGS. 5a to c is always the position designated by reference character 26 in FIG. 2.

In the case of FIG. 5a, at the beginning the driver makes a turn of 52%, in FIG. 5b of 83%, and in FIG. 5c of 91%.

As can be seen from the comparison in FIGS. 5a to c, parking is possible with all the various initial steering turns, but results in different parking positions 32a to 32c, via different parking paths Pa to Pc. There is an optimal initial steering turn having only two sections according to FIG. 5b, which is also indicated to the driver as a steering angle to be set, but in all other cases successful parking is also possible.

In addition, in the representation according to FIGS. 5a to c, the curve of the front Ba-Bc or of the rear Ha-Hc of vehicle 1 during the parking process is drawn in. Here as well, clear differences can be recognized for the various possible parking paths Pa to Pc. In these examples, it is permissible for the rear right corner of vehicle 1 to cross the boundary at distance line 24, in that the rear of the vehicle protrudes over the curb; only a driving up onto the curb with the wheels is forbidden.

FIG. 6 shows a sequence of the method.

The method begins with step S1, in which the driver starts a parking process by indicating to the system a desire to park in a parking space. Subsequently, in step S2 the search for a suitable parking space takes place, in which a suitable parking place is determined and measured. The driver is instructed to maintain initial position 26 (cf. FIG. 2). Subsequently, in step S3 there follows the determination of a planned steering angle and the planning of a trajectory with the planned steering angle. In step S4, the driver receives a corresponding driving instruction. Subsequently, a trajectory planning takes place with the currently set steering angle, in step S5. If during the trajectory planning it turns out that the driver can reach the end position with the set steering angle, an instruction to drive is issued in step S6. If in step S5 it turns out that parking is not possible with the current steering angle, a corrective instruction is issued and the method jumps via branch S5a to step S7, at which a stop instruction is issued. During travel, the method jumps via branch S6a cyclically back to step S5, where the trajectory planning is updated on the basis of the current steering angle.

If in step S6 it is determined that the end of the section has been reached, the method also jumps to step S7. In step S7, it is checked whether the parking process has terminated. If this is the case, the method ends at step S8. If the end of the parking process has not yet been reached, the method jumps via branch S7a back to step S3, where the trajectory planning for the next section is introduced, etc.

Optionally, instead of the currently measured steering wheel angle, a filtered value of the steering wheel angle can also be used for the trajectory planning. In this manner, a certain degree of insensitivity of the method can be achieved with regard to rapid fluctuations of the steering wheel angle (measurement noise or "jerking or shaking").

Although in the above-explained example embodiment both the steering angle and the stopping path are robustly planned, the advantages described above can be achieved, with a certain limitation, even if only one of the two quantities is robustly planned.

What is claimed is:

1. A method for outputting parking instructions to a driver of a vehicle, comprising:
    dividing a parking process into a multiplicity of sections each having a constant specified steering angle, a stopping point being situated between each two sections that is to be approached within a stopping path after a corresponding stop instruction,
    defining a respective tolerance band for at least one of (a) the stopping path and (b) a steering angle; and
    defining, for each section, a corresponding stop instruction corresponding to at least one of (a) a specified stopping path and (b) a corresponding specified steering angle, taking into account the respective tolerance band.

2. The method according to claim 1, wherein during a driving instruction a cyclical check is performed as to whether a current steering angle lies in a valid range of possible steering angles for successful parking, and a corrective instruction for stopping and for setting a corrected steering angle is outputted only if a relevant steering angle lies outside the range of valid steering angles.

3. The method according to claim 1, wherein immediately after stopping of the vehicle at a respective stopping point, a check is performed as to whether the stopping path lies in a valid range of possible stopping paths for successful parking, and a corrective instruction for setting a correct stopping path, in the form of an additional section, is outputted only if an actual stopping path lies outside the range of valid stopping paths.

4. The method according to claim 1, wherein the tolerance band is dynamically adapted.

5. The method according to claim 4, wherein the dynamic adaptation of the tolerance band for the stopping path takes into account a statistical variance of acquired stopping paths.

6. The method according to claim 4, wherein the dynamic adaptation of the tolerance band for the steering angle takes into account a statistical variance of acquired steering angle settings.

7. The method according to claim 1, wherein a size of a respective tolerance band is selected corresponding to various driver categories.

8. The method according to claim 1, wherein on the basis of at least one criterion, a successful parking process is defined ahead of time, the criterion permitting a multiplicity of end positions.

9. The method according to claim 8, wherein the criterion includes at least one of (a) a maximum number of passes, (b) a minimum pass length, (c) a maximum protrusion into an opposite lane of traffic, (d) one of (i) a minimum and (ii) a maximum distance to a curb, (e) a maximum distance to a reference line defined by adjacent parked vehicles, (f) a maximum angular deviation from at least one of (i) a direction of the curb and (ii) a reference line, (g) one of (i) a minimum and (ii) a maximum distance from front and rear parking space boundaries.

10. A device for outputting parking instructions to a driver of a vehicle, a parking process being divided into a multiplicity of sections each having a constant specified steering angle, and there being situated between each two sections a stopping point that is to be approached within a stopping path after a corresponding stop instruction, comprising:
    an environment acquisition unit configured to acquire a parking space;
    an evaluation unit configured to define a tolerance band for at least one of (a) the stopping path and (b) a steering angle and to define a corresponding stop instruction corresponding to at least one of (a) a specified stopping path and (b) a corresponding specified steering angle for a respective section, taking into account the respective tolerance band;
    an output unit configured to output instructions for steering angle and stopping points, in response to the evaluation unit;
    a steering angle sensor configured to determine a current steering angle; and
    a distance sensor configured to determine a traveled distance.

* * * * *